(12) United States Patent
Casaliggi et al.

(10) Patent No.: US 9,920,626 B2
(45) Date of Patent: Mar. 20, 2018

(54) BALANCED ROTOR DISC, AND BALANCING METHOD

(71) Applicant: SNECMA, Paris (FR)

(72) Inventors: Pascal Casaliggi, Moissy-Cramayel (FR); Remi Bourion, Moissy-Cramayel (FR); Thierry Capolungo, Moissy-Cramayel (FR)

(73) Assignee: SNECMA, Paris (FR)

( * ) Notice: Subject to any disclaimer, the term of this patent is extended or adjusted under 35 U.S.C. 154(b) by 238 days.

(21) Appl. No.: 14/715,488

(22) Filed: May 18, 2015

(65) Prior Publication Data
US 2015/0330224 A1 Nov. 19, 2015

(30) Foreign Application Priority Data

May 19, 2014 (FR) ..................................... 14 54471

(51) Int. Cl.
*F01D 5/10* (2006.01)
*F01D 5/02* (2006.01)
(Continued)

(52) U.S. Cl.
CPC ............... *F01D 5/027* (2013.01); *F01D 5/02* (2013.01); *F04D 29/662* (2013.01); *F16F 15/32* (2013.01);
(Continued)

(58) Field of Classification Search
CPC ...... F01D 5/027; F01D 5/10; F05D 2260/182; F05D 2260/96; F04D 29/662
See application file for complete search history.

(56) References Cited

U.S. PATENT DOCUMENTS

| 7,364,402 B2 * | 4/2008 | Brault | F01D 5/027 415/174.5 |
| 8,328,519 B2 * | 12/2012 | Denis | F01D 5/027 29/889 |

(Continued)

FOREIGN PATENT DOCUMENTS

| DE | 102009014846 | 10/2010 |
| EP | 1445422 | 8/2004 |
| EP | 1717415 | 11/2006 |

OTHER PUBLICATIONS

French Search Report and Written Opinion, dated Feb. 24, 2015, French Application No. 1454471.

*Primary Examiner* — Ninh H Nguyen
(74) *Attorney, Agent, or Firm* — Womble Bond Dickinson (US) LLP

(57) ABSTRACT

A rotor disc (1) for a turbomachine, including a radial flange (2) that includes a plurality of fastening holes (3), and a plurality of scallops (4) forming notches in the flange (2), and being separated by inter-scallop flange portions (7). The flange alternatively has, in its circumferential direction: a fastening hole (3) and an inter-scallop flange portion (7) arranged in the radial extension of the fastening hole (3), and a scallop (4), in such a way that one or more of the scallops ($4_7$, $4_8$, $4_9$; $4_2$, $4_5$-$4_7$, $4_8$-$4_{11}$, $4_{14}$) has a volume greater than the volume of each of the other scallops ($4_1$-$4_6$, $4_{10}$-$4_{14}$; $4_1$, $4_3$, $4_4$, $4_{12}$, $4_{13}$), and one or more of the inter-scallop flange portions ($7_3$) has a volume less than the volume of each of the other inter-scallop flange portions ($7_1$, $7_2$, $7_4$), in order to balance said disc (1). A turbomachine including that rotor disc and a method for balancing a turbomachine rotor disc are also disclosed.

8 Claims, 5 Drawing Sheets

(51) Int. Cl.
*F04D 29/66* (2006.01)
*F16F 15/32* (2006.01)

(52) U.S. Cl.
CPC ...... *F05D 2220/30* (2013.01); *F05D 2240/24* (2013.01); *F05D 2260/15* (2013.01); *Y02T 50/671* (2013.01); *Y10T 29/49334* (2015.01)

(56) References Cited

U.S. PATENT DOCUMENTS

| | | | | |
|---|---|---|---|---|
| 8,353,670 | B2* | 1/2013 | Glasspoole | F01D 5/027 416/144 |
| 8,727,719 | B2* | 5/2014 | Belmonte | F01D 5/066 415/209.2 |
| 2010/0080705 | A1 | 4/2010 | Pronovost et al. | |
| 2011/0044816 | A1 | 2/2011 | Lecuyer et al. | |
| 2013/0236310 | A1 | 9/2013 | Billings et al. | |

\* cited by examiner

BALANCED ROTOR DISC, AND BALANCING METHOD

FIELD OF THE INVENTION

The invention relates to a rotor disc of a turbomachine, and a method for balancing this disc.

TECHNOLOGICAL BACKGROUND

In a turbomachine, provision is made for one or more rotors, each comprising at least one disc. This disc generally receives the blade feet.

It is necessary to mechanically balance the disc of the rotor, particularly with respect to its imbalance. Various balancing methods have been proposed in the prior art.

A solution consists in installing a balance cable.

This solution is however penalizing with respect to the overall weight.

In addition, certain parts of the disc have a fixed geometry to enforce the cutting of the air stream.

Furthermore, some spaces are required for the passage of bolt-tightening tools to fasten the disc.

Consequently, the space available for the installation of such a cable is small, which can make it complex to implement.

Another solution consists in balancing the disc via rivets. This solution is also penalizing with respect to the overall weight. Furthermore, the two faces of the flange upstream of the disc are generally in contact with other parts (such as another disc or balancing weights), making the installation of rivets impossible.

SUMMARY OF THE INVENTION

In order to palliate these drawbacks, the invention makes provision for a rotor disc of a turbomachine, comprising a radial flange that has a plurality of fastening holes, and a plurality of scallops forming notches in the flange, and being separated by inter-scallop flange portions, characterized in that the flange alternatively has, in its circumferential direction:
  a fastening hole and an inter-scallop flange portion arranged in the radial extension of the fastening hole, and
  a scallop,
  in such a way that one or more of the scallops has a volume greater than the volume of each of the other scallops, and that one or more of the inter-scallop flange portions has a volume less than the volume of each of the other inter-scallop flange portions, in order to balance said disc.

The invention is advantageously completed by the following features, taken alone or in any technically possible combination:
  the scallops have an apex on the radial axis, and all the scallop apexes are positioned in such a way as to belong to one and the same circle;
  the scallops having a volume greater than the volume of each of the other scallops are not adjacent to each other, and/or the inter-scallop flange portions having a volume less than the volume of each of the other inter-scallop flange portions are not adjacent to each other;
  the flange extends toward the outside of the disc;
  the flange extends toward the inside of the disc.

The invention also relates to a turbomachine comprising a rotor at least one disc of which is as previously described.

The invention also relates to a method for balancing a turbomachine rotor disc comprising a radial flange that has a plurality of fastening holes, and a plurality of scallops forming notches in the flange, and being separated by inter-scallop flange portions, characterized in that the flange alternatively has, along its circumferential direction:
  a fastening hole and an inter-scallop flange portion arranged in the radial extension of the fastening hole, and
  a scallop,
  the method comprising steps consisting in measuring the imbalance of the disc, machining one or more scallops, in order that the latter have a volume greater than the volume of each of the other scallops, and one or more inter-scallop flange portions, in order that the latter have a volume less than the volume of each of the other inter-scallop flange portions, in such a way as to balance the disc with respect to the measured imbalance.

The method is advantageously completed by the following features, taken alone or in any of technically possible combinations:
  the method comprises the step consisting in selecting the scallops and/or inter-scallop flange portions to be machined as a function of the amplitude and/or angular position of the measured imbalance;
  prior to the machining step, the scallops have an apex on the radial axis of the disc, and the step of machining the scallops does not alter the position of said apexes on a radial axis of the disc.

The invention has many advantages.

The invention makes provision for a balancing method with increased robustness.

Furthermore, the solution avoids the addition of additional weights, intended solely for balancing. A saving in weight is therefore achieved.

Finally, the solution makes it possible to maintain the possibility of installing weights for balancing the unit comprising the disc.

DESCRIPTION OF THE DRAWINGS

Other features, aims and advantages of the present invention will become more apparent on reading the following detailed description, with reference to the appended drawings given by way of non-limiting example and wherein.

DETAILED DESCRIPTION

Rotor Disc

Figure 1:
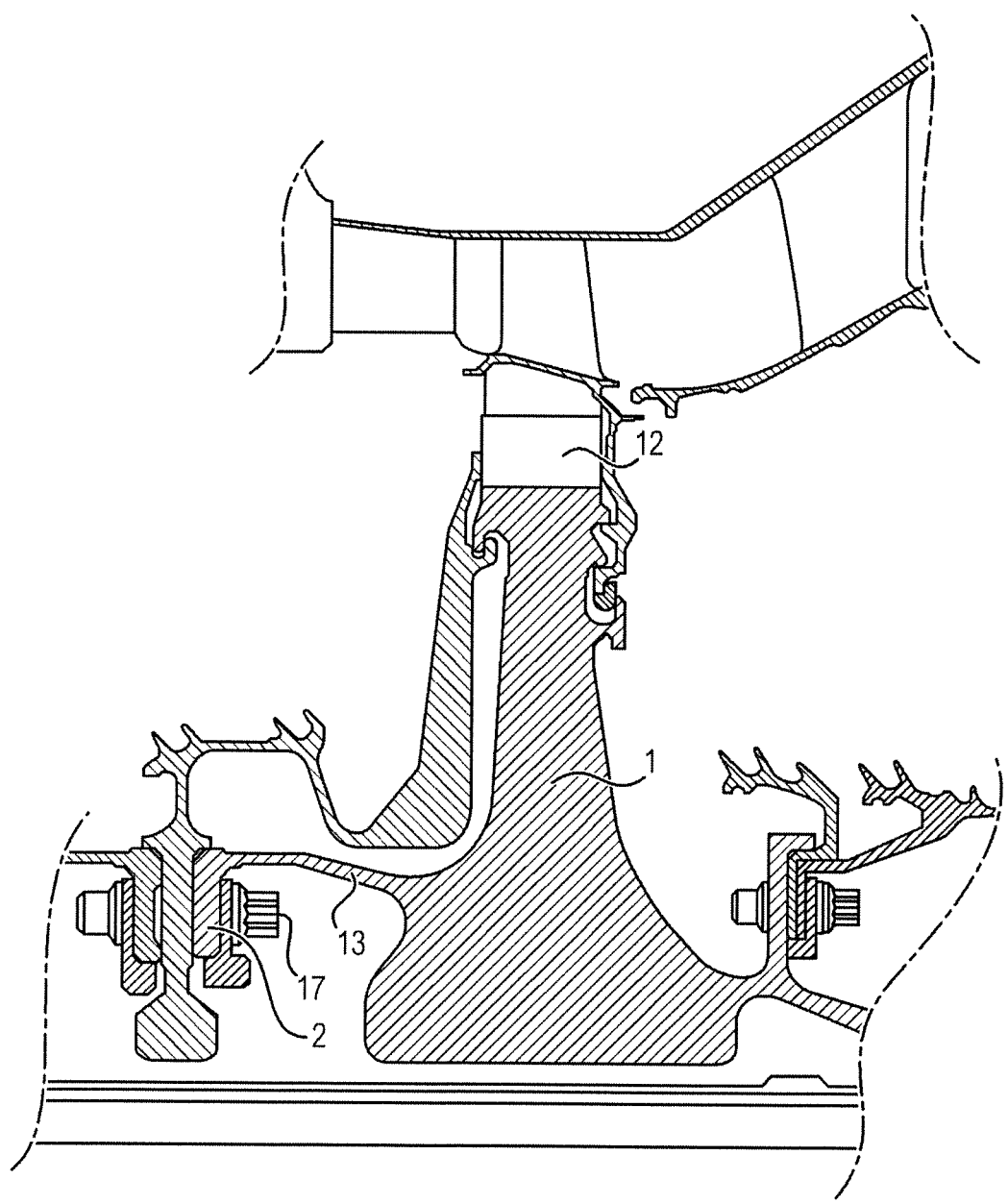
FIG. 1 is a sectional representation of a rotor disc connected to other parts of the turbomachine via its upstream flange and its downstream flange.
Figure 2:
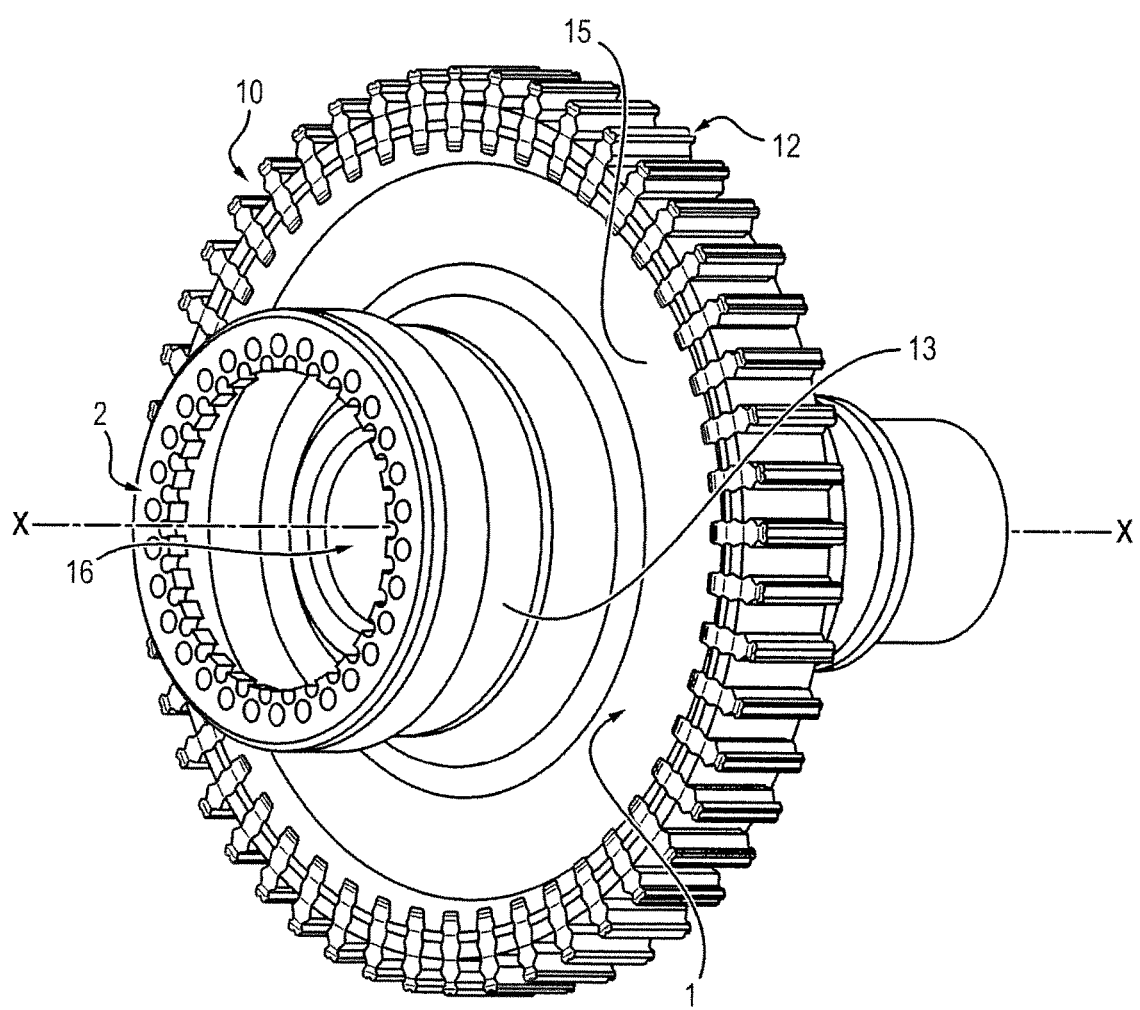
FIG. 2 is a three-dimensional representation of a rotor disc.

FIGS. 1 and 2 represent a turbomachine rotor disc 1 along a longitudinal axis XX.

The disc 1 is generally not full, and comprises a full annular outer part 15, and a hole 16 in its centre.

The disc 1 has a circumference 12 capable of receiving blades.

For example, the circumference 12 comprises a plurality of housings 10 for receiving blades.

The disc 1 further comprises at least one flange 2. In the figures, the flange 2 is carried by a portion 13 which extends in projection along the longitudinal axis XX from the annular outer part 15 of the disc 1. The solution applies to both the upstream flange and the downstream flange of the disc 1. The flange 2 allows the fastening of the disc to adjacent parts of the rotor or of the turbomachine.

The flange 2 extends circumferentially and on a radial axis. In the figures, the flange 2 extends around the circumference of the portion 13 in projection. It can however extend around any other circumference of the disc 1. In the figures, the flange 2 extends radially toward the outside of the disc 1. In a variant, the flange 2 extends radially toward the inside of the disc 1.

Figure 3:
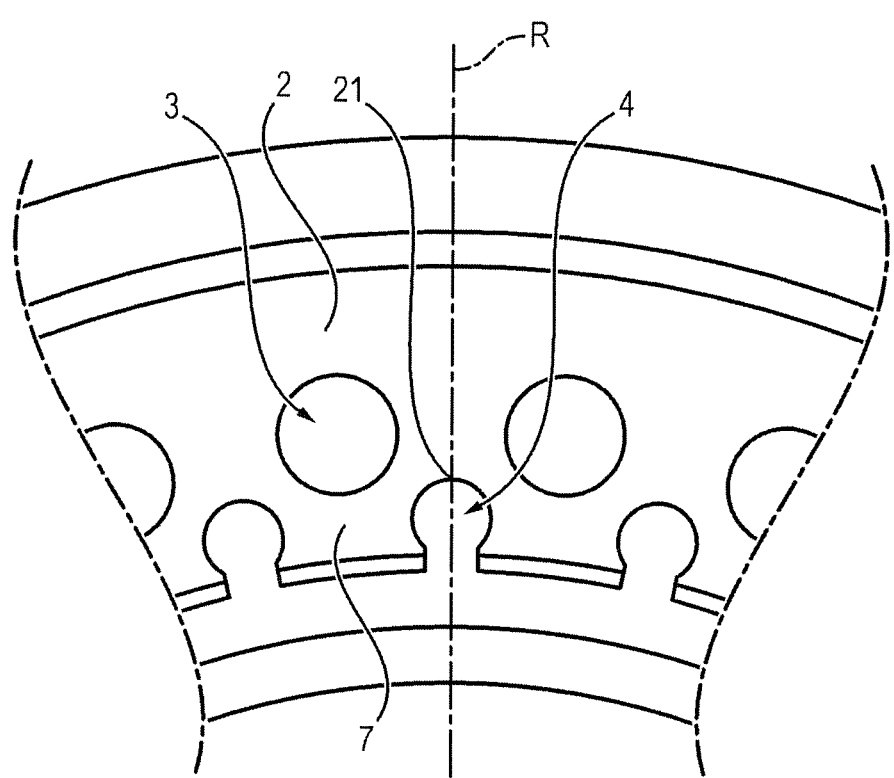
FIG. 3 is a representation of a part of the flange of a rotor disc.

The flange 2 comprises a plurality of fastening holes 3 (cf. FIG. 3). These holes 3 allow fastening to another part of the motor, such as for example another disc, by way of fastening parts 17 passing through these holes 3 and supplementary holes provided in the adjacent part.

The flange 2 also comprises a plurality of scallops 4. These scallops 4 form notches in the flange 2. These scallops 4 particularly serve to de-stress the holes 3 of the flange 2 and to ensure its mechanical strength. Furthermore, these scallops make it possible to obtain a saving in weight.

The flange 2 alternatively has fastening holes 3 and scallops 4.

The scallops 4 are themselves separated by flange portions 7, which will be described below as inter-scallop flange portions 7.

The scallops 4 are therefore hollowed-out parts of the flange 2, and the inter-scallop flange portions 7 are material parts of the flange 2.

As illustrated, the flange alternatively has, along its circumferential direction:
- a fastening hole 3 and an inter-scallop flange portion 7 arranged in the radial extension of the fastening hole 3, and
- a scallop 4.

Thus, the fastening holes 3 are all mutually separated by a scallop 4.

According to an embodiment, one or more scallops each has or have a volume greater than that of each of the other scallops. The volume of a scallop 4 is understood to mean the volume of the hollowed-out part formed by said scallop 4 in the flange 2.

This results from the fact that the section of said scallop (or said scallops) in a radial plane (plane orthogonal to the longitudinal axis XX) is greater than the section of the other scallops.

In other words, certain scallops each form notches of a volume greater than that of the other scallops in the flange 2.

This configuration makes it possible to mechanically balance the disc 1, particularly with respect to its imbalance. As explained below, the appropriate choice of the number and/or the position and/or the volume of the scallops in question makes it possible to reduce or remove the imbalance of the disc 1.

Figure 4:
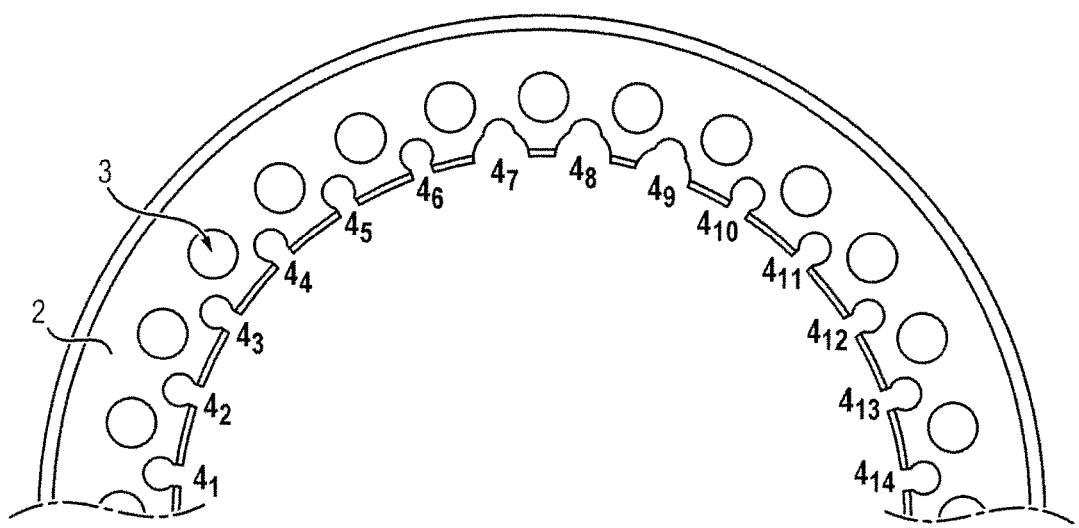
FIG. 4 is a representation of an exemplary embodiment of a flange having scallops of a volume greater than that of each of the other scallops.
Figure 5:
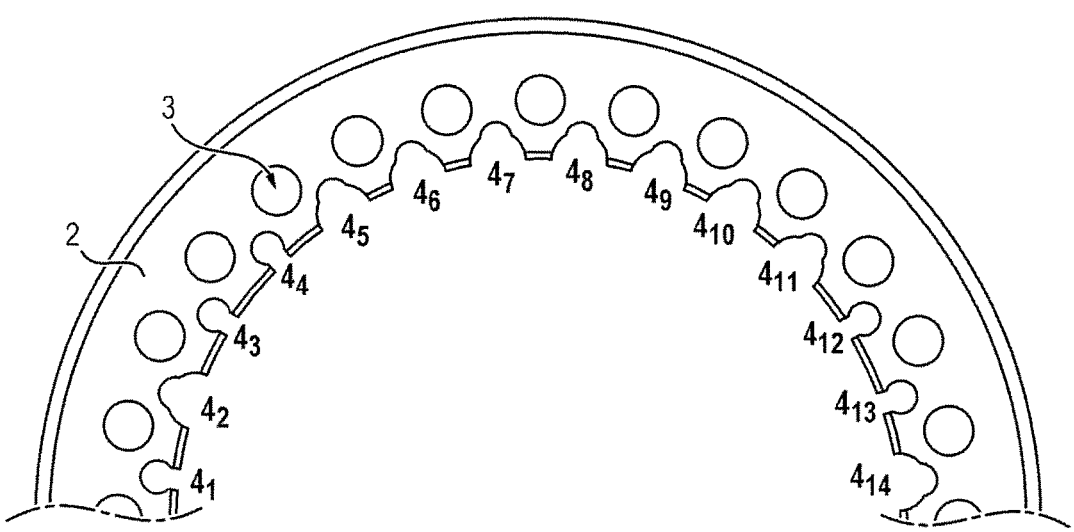
FIG. 5 is a representation of another exemplary embodiment of a flange having scallops of a volume greater than that of each of the other scallops.

Examples are shown in diagram form in FIGS. 4 and 5.

In FIG. 4, the scallops $4_7$, $4_8$ and $4_9$ each have a volume greater than that of each of the other scallops $4_1$ to $4_6$, and $4_{10}$ to $4_{14}$ of the flange 2.

It should be noted that the flanges having a volume greater than that of each of the other scallops are not necessarily adjacent to each other on the flange 2.

FIG. 5 illustrates a configuration wherein the scallops $4_2$, $4_5$, $4_6$, $4_7$, $4_8$, $4_9$, $4_{10}$, $4_{11}$, $4_{14}$, which have a volume greater than that of each of the other scallops $4_1$, $4_3$, $4_4$, $4_{12}$ and $4_{13}$, are not all adjacent to each other.

Alternatively, or additionally, at least one inter-scallop flange portion has a volume less than that of each of the other inter-scallop flange portions. The term "volume of inter-scallop flange portion" refers to the volume of material occupied by said inter-scallop flange portion.

Certain inter-scallop flange portions are therefore machined in such a way as to have a volume less than that of each of the other unmachined portions. The removal of material is for example carried out along the radial axis of the disc, substantially perpendicular to the longitudinal axis XX.

Figure 6:
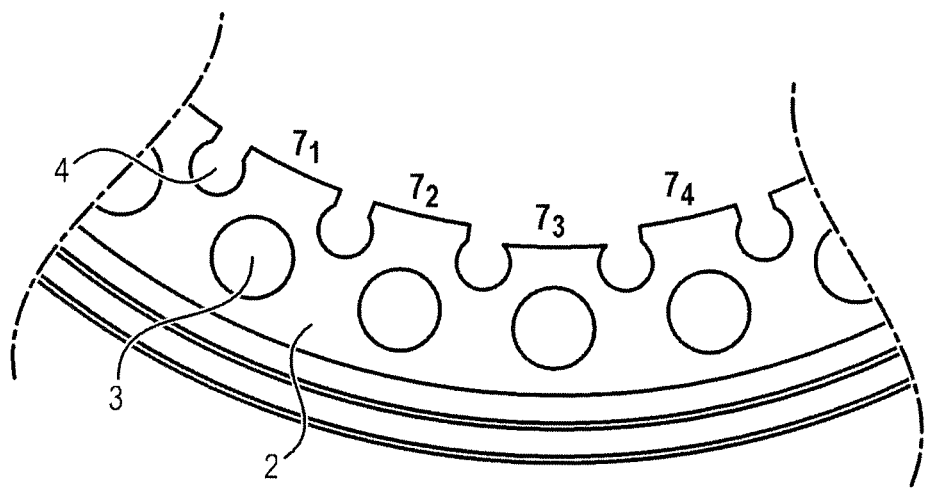
FIG. 6 is a representation of an exemplary embodiment of a flange having an inter-scallop flange portion of a volume greater than that of each of the other inter-scallop flange portions.

FIG. 6 illustrates an example wherein the inter-scallop flange portion $7_3$ has a volume less than the volume of each of the other inter-scallop flange portions $7_1$, $7_2$, $7_4$.

According to a possible aspect, the inter-scallop flange portions having a volume less than the volume of each of the other inter-scallop flange portions are not adjacent to each other.

The solution using one or more inter-scallop flange portions of volume less than the volume of each of the other flange portions makes it possible to improve the angular precision of the imbalance pick-up.

As illustrated in FIG. 3, the scallops 4 have an apex 21 on the radial axis. In an embodiment (cf. FIGS. 4 and 5), all the apexes 21 of the scallops 4 are positioned in such a way as to belong to one and the same circle. In other words, even the scallops that have a greater volume after machining have an apex 21, the position of which is not moved but is preserved.

The preservation of the position of the apexes 21 of the scallops 4 of greater volume, even after their machining, allows the latter to preserve their function of de-stressing of the flange 2 (which depends in particular on the radial position of their apex 21 with respect to the fastening holes 3).

The rotor disc 1 can for example be installed in a compressor (high-pressure or low-pressure) and/or in a turbine (high-pressure or low-pressure) of a turbomachine. The proposed balancing method is particularly advantageous in an aircraft used for business aviation, which requires a precise balancing of the parts of the high-pressure turbine.

Balancing Method

Figure 7:
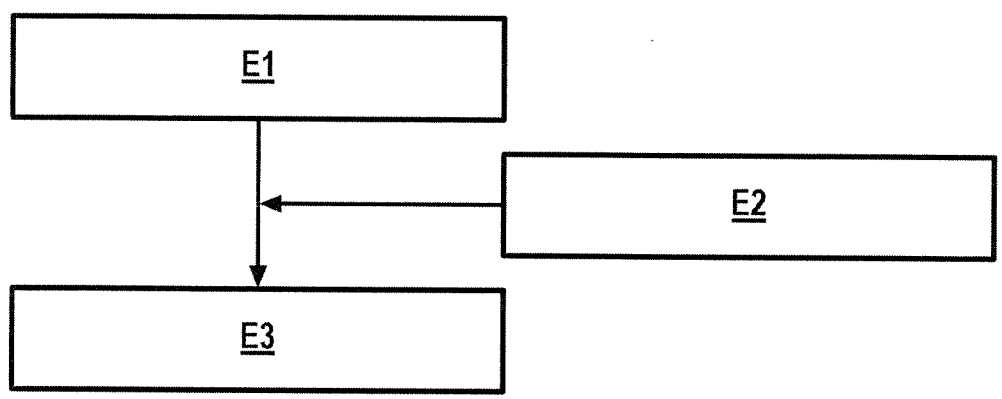
FIG. 7 is a representation of a method for balancing a rotor disc.

A method (cf. FIG. 7) will now be described for balancing a turbomachine rotor disc 1 comprising a flange 2 that has a plurality of fastening holes 3, and a plurality of scallops 4 forming notches in the flange 2, and being separated by inter-scallop flange portions 7. This disc 1 is as previously described.

One of the functions of the scallops is to de-stress the flange 2.

According to a possible aspect, the scallops 4 have a rounded outline, in such a way as to maximize the flange material 2 that can be removed in the subsequent machining stage.

A first step E1 consists in measuring the imbalance of the disc 1 by way of a device for measuring the imbalance of the prior art, called balancer by the person skilled in the art.

The method then comprises the step E3 consisting in machining:
- one or more scallops, in order for the latter to have a greater volume than each of the other scallops, and/or
- one or more inter-scallop flange portions, in order for the latter to have a volume less than each of the other inter-scallop flange portions.

The machining of the disc 1 as described makes it possible to balance the disc 1 with respect to the measured imbalance.

According to a possible aspect, the method includes step E2 consisting in selecting the scallops and/or inter-scallop flange portions to be machined as a function of the amplitude and/or the angular position of the measured imbalance.

The selection of the scallops and/or the inter-scallop flange portions to be machined can be effected as follows.

A processing unit, integrated into the measurement device, or external, supplies, from the measurement of the imbalance and from an equivalence table, the angular position and the number of scallops to be machined. Where applicable, the processing unit also supplies the volume of the scallops to be machined.

The equivalence table takes into account the parameters of the components (dimensions, positions etc.).

Alternatively, or additionally, the processing unit supplies the angular position and the number of inter-scallop flange portions to be machined. Where applicable, the processing unit also supplies the volume of the inter-scallop flange portions to be machined.

Prior to the machining step, the scallops 4 have an apex 21 (cf. FIG. 3) on the radial axis (R) of the disc. According to a possible aspect, the step of machining the scallops 4 does not alter the position of said apexes 21 on the radial axis of the disc 1.

Specifically, the scallops 4 have two functions: firstly, the scallops 4 de-stress the flange 2, and secondly the scallops 4 of greater volume combat the imbalance.

The preservation of the position of the apexes 21 of the scallops 4 of greater volume, even after their machining, allows the latter to preserve their function of de-stressing the flange 2 (which depends in particular on the radial position of their apex 21 in relation to the fastening holes 3).

The machining with the aim of increasing the volume of the scallops in question is therefore effected in all directions as long as it does not alter the radial position of the apex 21.

In an embodiment, the disc 1 does not initially have scallops, and the latter are produced in the machining step E3.

This step E3 then comprises the machining of the flange 2 to produce a sufficient number of scallops required for the balancing of the disc 1. The angular position of the scallops is fixed and determined beforehand by the position of the holes 3. Additionally, this step E3 can also comprise the machining of the inter-scallop flange portions, as mentioned previously.

The invention claimed is:

1. A rotor disc (1) for a turbomachine, comprising a radial flange (2) that has a plurality of fastening holes (3), and a plurality of scallops (4) forming notches in the flange (2), and being separated by inter-scallop flange portions (7), the flange comprising around its circumference in an alternating arrangement:
   - a single fastening hole (3) and an inter-scallop flange portion (7) arranged in the radial extension of the fastening hole (3), and
   - a single scallop (4), wherein
   - one or more of the scallops ($4_7$, $4_8$, $4_9$; $4_2$, $4_5$-$4_7$, $4_8$-$4_{11}$, $4_{14}$) has a volume greater than the volume of each of the other scallops ($4_1$-$4_6$, $4_{10}$-$4_{14}$; $4_1$, $4_3$, $4_4$, $4_{12}$, $4_{13}$), and
   - one or more of the inter-scallop flange portions ($7_3$) has a volume less than the volume of each of the other inter-scallop flange portions ($7_1$, $7_2$, $7_4$), in order to balance said disc (1).

2. The disc (1) according to claim 1, wherein:
   the scallops (4) have an apex (21) on the radial axis, and
   all the apexes (21) of the scallops (4) are positioned in such a way as to belong to one and the same circle.

3. The disc (1) according to claim 1, wherein:
   the scallops having a volume greater than the volume of the other scallops are not adjacent to each other, and/or
   the inter-scallop flange portions having a volume less than the volume of the other inter-scallop flange portions are not adjacent to each other.

4. The disc according to claim 1, wherein the flange (2) extends toward the outside of the disc (1).

5. A turbomachine comprising a rotor, at least one disc (1) of which is in accordance with claim 1.

6. A method for balancing a turbomachine rotor disc (1) comprising a radial flange (2) that has a plurality of fastening holes (3), and a plurality of scallops (4) forming notches in the flange (2), and being separated by inter-scallop flange portions (7), characterized in that the flange alternatively has, in its circumferential direction:
   - a single fastening hole (3) and an inter-scallop flange portion (7) arranged in the radial extension of the fastening hole (3), and
   - a single scallop (4), the method comprising the steps:
   measuring (E1) the imbalance of the disc (1);
   machining (E3)
   - one or more scallops ($4_7$, $4_8$, $4_9$; $4_2$, $4_5$-$4_7$, $4_8$-$4_{11}$, $4_{14}$), in order for the latter ($4_1$, $4_2$, $4_3$) to have a volume greater than the volume of each of the other scallops ($4_1$-$4_6$, $4_{10}$-$4_{14}$; $4_1$, $4_3$, $4_4$, $4_{12}$, $4_{13}$), and
   - one or more inter-scallop flange portions ($7_3$) in order for the latter to have a volume less than each of the other inter-scallop flange portions ($7_1$, $7_2$, $7_4$), in such a way as to balance the disc (1) with respect to the measured imbalance.

7. The method according to claim 6, comprising a step (E2) selecting the scallops and/or inter-scallop flange portions to be machined as a function of the amplitude and/or angular position of the measured imbalance.

8. The method according to claim 6, wherein:
   prior to the machining step, the scallops (4) have an apex (21) on the radial axis of the disc, and
   the step of machining the scallops (4) does not alter the position of said apexes on a radial axis of the disc (1).

\* \* \* \* \*